United States Patent
Pattabhi et al.

(10) Patent No.: US 8,935,234 B2
(45) Date of Patent: Jan. 13, 2015

(54) REFERENTIALLY-COMPLETE DATA SUBSETTING USING RELATIONAL DATABASES

(75) Inventors: Ravi Pattabhi, Acton, MA (US); Balasubrahmanyam Kuchibhotla, San Ramon, CA (US)

(73) Assignee: Oracle International Corporation, Redwood Shores, CA (US)

( * ) Notice: Subject to any disclaimer, the term of this patent is extended or adjusted under 35 U.S.C. 154(b) by 192 days.

(21) Appl. No.: 13/603,126

(22) Filed: Sep. 4, 2012

(65) Prior Publication Data

US 2014/0067867 A1    Mar. 6, 2014

(51) Int. Cl.
*G06F 17/30* (2006.01)

(52) U.S. Cl.
USPC ........................... 707/718; 707/709; 707/803

(58) Field of Classification Search
CPC .................... G06F 17/30469; G06F 17/30471; G06F 17/30463
USPC .................................. 707/718, 798, 792, 803
See application file for complete search history.

(56) References Cited

U.S. PATENT DOCUMENTS

| | | | |
|---|---|---|---|
| 6,513,029 B1* | 1/2003 | Agrawal et al. | 1/1 |
| 6,834,290 B1* | 12/2004 | Pugh et al. | 707/803 |
| 7,076,493 B2* | 7/2006 | Myers et al. | 707/749 |
| 7,882,134 B2 | 2/2011 | Pattabhi et al. | |
| 7,979,410 B2 | 7/2011 | Pattabhi et al. | |
| 8,438,573 B2* | 5/2013 | Gusev et al. | 718/104 |
| 8,447,754 B2* | 5/2013 | Weissman et al. | 707/713 |
| 8,676,772 B2* | 3/2014 | Gislason | 707/696 |
| 2003/0055813 A1* | 3/2003 | Chaudhuri et al. | 707/3 |
| 2008/0209397 A1* | 8/2008 | Mohindra et al. | 717/120 |
| 2008/0319829 A1* | 12/2008 | Hunt et al. | 705/10 |
| 2011/0208703 A1* | 8/2011 | Fisher et al. | 707/692 |
| 2011/0320431 A1* | 12/2011 | Jackson et al. | 707/713 |
| 2012/0323929 A1* | 12/2012 | Kimura et al. | 707/748 |
| 2013/0226959 A1* | 8/2013 | Dittrich et al. | 707/769 |
| 2014/0019490 A1* | 1/2014 | Roy et al. | 707/798 |

* cited by examiner

*Primary Examiner* — Leslie Wong
(74) *Attorney, Agent, or Firm* — Vista IP Law Group, LLP (57) ABSTRACT

A method, system, and computer program product for relational database management. The method constructs a referentially-complete target subset database from a source database by first estimating the expected size of the target subset database based on application of one or more subsetting rules. If the estimated size needs reduction, the user can modify the subsetting rules, and then modules are invoked to receive the modified subset rules. The method continues by generating a subsetting execution plan by applying the user-modified subset rules to the source database, and then modules process the generated execution plan, which processing results in storage of a referentially-complete target subset database. The user can influence the construction of the execution plan by suggesting an execution model to use during processing of the subsetting execution plan. Techniques estimate the expected size by constructing a directed graph wherein edges in the directed graph represent relationships between database tables.

20 Claims, 8 Drawing Sheets

REFERENTIALLY-COMPLETE DATA SUBSETTING USING RELATIONAL DATABASES

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The disclosure relates to the field of relational database management and more particularly to techniques for performing referentially-complete data subsetting using relational databases.

BACKGROUND

Some embodiments of the present disclosure are directed to an improved approach for implementing referentially-complete data subsetting using relational databases.

The term "data subsetting" refers to the process of creating a partial copy of a given database that comprises only a subset of the data in the given database, yet contains the portions of the data needed for the intended purposes of the smaller copy. The motivations for creating the smaller copy are varied, including at least (for example) when a company is split to two separate operating units and only portions of the given database are applicable to one or the other of the operating units. Another motivation is (for example) when ensuring that a given "production" database can fit into/onto a smaller target computing platform.

Generally, it is intended that the partial copy, even though smaller, nevertheless be referentially complete within itself. The referential completeness of the database ensures that there are no dangling references in the data, e.g., applications that rely on referential completeness of the database perform as intended using the partial copy.

Unfortunately, prior attempts at data subsetting have suffered from many deficiencies and/or side-effects. The legacy examples below highlight these deficiencies:

Subset Size Cutoff/Limits: In this legacy technique, a subset is created by assuming an arbitrary percentage of the original number of rows. This technique does not take into account data relationship cardinality. Frequently, because of variations in data distribution, it is not possible to estimate the impact of picking up an arbitrarily-limited number or percentage of rows in a table.

Blind Subtraction: Legacy deletion techniques merely make a copy of the database and delete rows. This technique can be very slow, especially when deleting rows requires undo and/or redo logging operations. Also, this process requires the setup of a shadow production copy which can consume the same amount of space as the production copy itself.

Remote Copy Creation: A subset execution model is characterized by copying the rows to a test system over JDBC (Java Database Connectivity) or other database connections. This method requires that data be moved a few rows at a time and it does not minimize redo and undo logging.

Moreover, the aforementioned technologies do not necessarily perform in a manner so as to create a referentially-complete data subset. Therefore, there is a need for an improved approach.

SUMMARY

The present disclosure provides an improved method, system, and computer program product suited to address the aforementioned issues with legacy approaches. More specifically, the present disclosure provides a detailed description of techniques used in methods, systems, and computer program products for creating referentially-complete data subsets when using relational databases.

Herein-disclosed are methods, systems, and computer program products for relational database management. One exemplary method constructs a referentially-complete target subset database from a source database by first estimating the expected size of the target subset database based on application of one or more subsetting rules. If the estimated size needs reduction (e.g., as may be determined by a user), the user can modify the subset rules, and then modules can be invoked to receive the modified subset rules. The method continues by generating a subsetting execution plan by applying the user-modified subset rules to the source database, and then modules process the generated execution plan, which processing results in storage of a referentially-complete target subset database. The user can influence the construction of the execution plan by suggesting an execution model to use during processing of the subsetting execution plan. Techniques estimate the expected size by constructing a directed graph wherein edges in the directed graph represent relationships between database tables.

Further details of aspects, objectives, and advantages of the disclosure are described below in the detailed description, drawings, and claims. Both the foregoing general description of the background and the following detailed description are exemplary and explanatory, and are not intended to be limiting as to the scope of the claims.

DETAILED DESCRIPTION

Some embodiments of the present disclosure are directed to an improved approach for implementing referentially-complete data subsetting using relational databases. More particularly, disclosed herein are environments, methods, and systems for implementing referentially-complete data subsetting using relational databases.

Overview

Data subsetting is the process of creating a copy of a production database that is smaller in size and yet referentially complete. The referential completeness of the database ensures that there are no unexpected irresolvable references in the smaller copy of the database. One exemplary motivation for subsetting comes to the fore when a company is split into two separate operating units.

Subsetting a production database is done using rules provided by a user. A subset rule describes which rows to keep while subsetting the database. A subsetting application can use this information to calculate the estimated size of the subsetted database. A subsetting application can also propose a subsetting plan to accomplish creating the subset via a prescribed sequence of operations. The estimation of the subset size prior to actually subsetting is used by a designer so that the designer of the subset rules can tailor the rules to meet a specific space goal of the subsetted database. A subset rule can be codified to describe any characteristic covering which rows to produce in the target subset database. For example, a characteristic might be an explicit direct specification such as "include all rows", or a characteristic might be presented as a "WHERE" conditional such as in a query, or any other characteristic (e.g., explicit specification, implicit specification, row number, data range, etc.) might be presented when defining a subset rule.

The subset plan serves to ensure that all related information gets subsetted when the user specifies a rule in a table. For example, if a subset rule pertaining to a "Departments" table specifies "only keep the sales department," then the subsetting application can proceed on the basis that only employees of the sales department need to be in the subsetted database. In determining the extent of related information to be subsetted when the user specifies a rule on a table, the application of a rule is pushed down through the chain of relationships to all related tables.

In some aspects of the embodiments disclosed herein, the following techniques can be employed:
- Storage space estimation: Estimation calculations performed while a user is designing subset rules.
- Rule impact assessment: Methods to analyze a rule pertaining to a given table to assess the impact of the rule as it pertains to other tables.
- Auto-planner: Methods to create a subsetting execution plan using the subset rules specified by the user.
- Plan execution: Methods to perform the subsetting in accordance with the subsetting plan and in accordance with any construction technique given by a selected subset execution model.

Aspects of the embodiments disclosed herein include many techniques that overcome deficiencies of legacy approaches, including:
- Separating the definition of a subsetting model to define a subsetting execution plan from the selected subset execution method (see below).
- Computing the extent of the target subset, and generation of a subsetting plan prior to execution of the subsetting plan using one of the subset execution models.
- User-specified selection of a subset execution method, including:
  - An export method of subsetting.
  - An in-place delete method of subsetting.
  - An insert-select method of subsetting over an SQL connection.

Further, using the above techniques aids the user and overcomes the deficiencies of the legacy approaches in at least the following regards:
- The user is provided with an accurate storage space usage summary of the planned subsetted database prior to actually performing the subsetting.
- The user can design subset WHERE clauses so as to ensure proper data distribution is maintained in the subset
- The population of the subsetting database using the population by row id results in similar or identical subset computations, irrespective of the user-selected subset execution model.
- The herein disclosed techniques using data subset model templates serve to reduce the need for user input when defining a subset for packaged applications, where the data subset needed by the packaged application is known a priori.
- The herein disclosed datapump export method of subsetting can write a subset directly from an on-line production database, thereby avoiding the need to provision staging areas. Moreover, the datapump subset method performs with great alacrity when compared with certain alternative techniques.

Descriptions of Exemplary Embodiments

Figure 1:
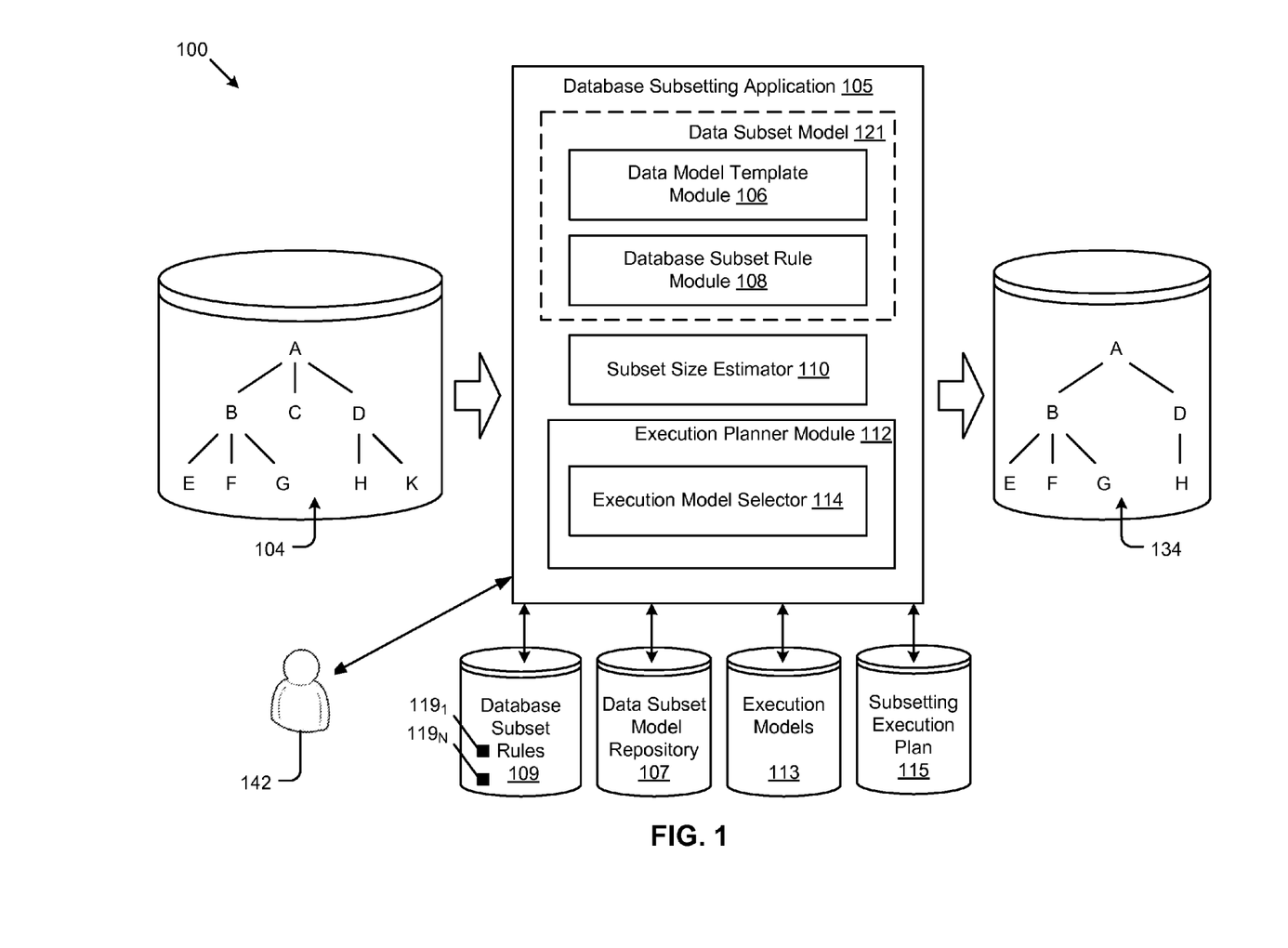
FIG. 1 is a schematic diagram of a system for performing referentially-complete data subsetting using relational databases, according to some embodiments.

FIG. 1 is a schematic diagram of a system 100 for performing referentially-complete data subsetting using relational databases. As an option, the present system 100 may be implemented in the context of the architecture and functionality of the embodiments described herein. Also, the system 100 or any aspect therein may be implemented in any desired environment.

As shown, a source database 104 undergoes a transformation using a database subsetting application 105 to create a target subset database 134. The processing as shown comprises defining a data subset model 121, estimating the size of the target subset database 134 based on the data subset model, planning the execution steps for creating the target subset database, and selecting an execution technique, which selected execution technique is applied to the source database to carry-out the planned execution steps.

A user 142 can interface with a database subsetting application 105 in order to establish parameters of the subsetting processing. In accordance with this embodiment, the flow separates out the activities of how a user might define the parameters from the subset execution, thus facilitating a use model where a user can get an estimate of the characteristics (e.g., size) of a target subset database 134 that would result from adherence to the user-specified parameters. Further, separation of the activities of creating of the data subset model 121 from the activities of actually creating the subset makes it easier to add new subset methods without changing the subset model. For example, a user can define a data subset model to describe the various tables and data relationships in a particular application, or an application data subset model template can also be retrieved from a data subset model repository 107. In some situations a data subset model to describe the various tables and data relationships in a particular application might correspond to a widely-distributed application, and a template can be stored in a data subset model repository 107, thus easing the burden on a user, since the user can import a data subset model by merely referencing the template, possibly using a data model template module 106.

Continuing the discussion of FIG. 1, a user defines the subset rules (e.g., database subset rules 109), possibly using a database subset rule module 108. Various forms of subset rules can occur as individual rules (e.g., subset rule $119_1$, subset rule $119_N$, etc.) and may specify a name of a table to include, a name of a table to exclude, or a Boolean operation to apply to a row of a table to determine inclusion or exclusion of that row. Or, a subset rule may specify that a certain table should be subsetted using a specific WHERE clause. As further described below, subset rules can also specify that some tables should not be subsetted, that is, some tables should be exported to the target subset database 134 in their entirety. Or conversely, various forms of a subset rule can specify that a particular table is not to be exported to the target subset database at all.

In a more general case, a user will create or use subset rules in a form that allows the user to pick out some portions of tables that are to be exported. When specifying a rule to pick a partial set of rows, a user can specify that ancestor and descendant rows should be included, or ancestor rows only should be included, or neither ancestor nor descendant rows should be included. Aspects of selection of ancestors or descendants are further described in the discussion of FIG. 4.

After specifying a data subset model and at least one instance of database subset rules 109, the user can view a space estimate. Such an estimate can include size quantities (e.g., a number of rows, a percentage of rows, an aggregate data size percentage, etc.). If the resulting subset space estimates meet the users space goals the user might proceed with further activities to create the database subset. Or, the user might change data subset model characteristics and/or add more rules (e.g., modified subset rule $119_1$, modified subset rule $119_N$, etc.), and/or modify existing rules to create one or more modified subset rules (e.g., modified subset rule $119_1$, modified subset rule $119_N$, etc.) and re-request a space estimate.

When the user is satisfied with the space estimate (e.g., the results of the subset size estimator 110), the user can review a plan (e.g., results of the execution planner module 112), and select a subset execution model under which execution is used to accomplish the creation of the target subset database 134. A particular subset execution model can be selected independent from other steps. For example, a subset execution model can fall under a datapump designation, or a subset execution model can fall under one or more deletion-oriented subset execution model, or any other subset execution model, which subset execution model can be stored in a database of execution models 113.

During performance of estimations, a subsetting execution plan 115 is generated that describes how to subset. The actual method for carrying out the subsetting execution plan can be specified using an execution model selector 114, which in turn can retrieve an execution model 113. Depending on the selected form of the execution model 113, performing the subset operations can be carried out in the plan to create a smaller copy, and the selected form of the execution model 113 may carry out the subsetting execution plan 115 differently from an alternate form of the execution model.

Now, suppose that the source database 104 comprises a database pertaining to "Company A", which company is to be divested. And in doing so only "Department B" and "Department D" are to survive the reorganization. Moreover "Department D" is going to be re-located, so the data items pertaining to the "Cubicle Number K" is not needed to be present in the target subset database 134. Following the operations described above, the user can specify to exclude "C", and "K", and then allow the system 100 to performing referentially-complete data subsetting using relational data to create the target subset database 134. The target subset database 134 would not include "C" and "K", but would include "E", "F", "G", and "H", even though the user had not explicitly specified to include "E", "F", "G", and "H".

Figure 2:
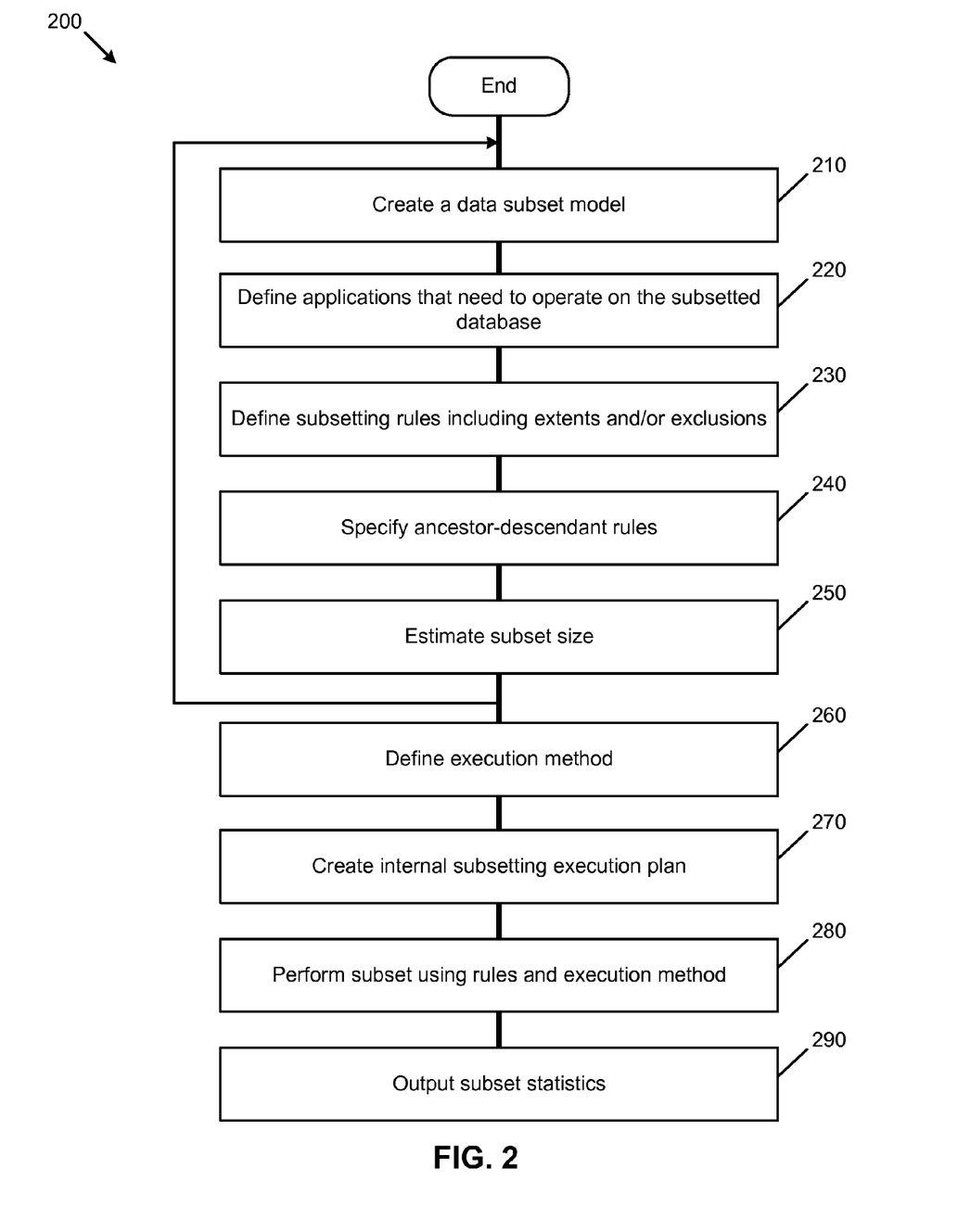
FIG. 2 depicts a set of operations used in a system for performing referentially-complete data subsetting using relational databases, according to some embodiments.

FIG. 2 depicts a set of operations used in a system 200 for performing referentially-complete data subsetting using relational databases. As an option, the present system 200 may be implemented in the context of the architecture and functionality of the embodiments described herein. Also, the system 200 or any aspect therein may be implemented in any desired environment, and the order of any operations of system 200 can be performed in any order unless as may be specified by the claims.

The discussion of FIG. 1 describes the specific embodiment shown, however the operations performed can be performed in other embodiments. For example, using any known technique a user can create a data subset model to describe the various applications, tables and data relationships in their applications (see operation 210). In another situation the a user might merely define one or more applications (see operation 220) for which a database is to be subsetted, and the specification of the application maps to one or more data subset model, possibly in the form of a data model template. Or, as earlier described, an application-specific form of a data subset model template can also be accessed, for example, from a public location, possibly using a URL. In this manner, data subset model templates can be downloaded for widely-distributed applications (e.g., Oracle EBS, Fusion etc.).

In one alternative, a user can explicitly define the subset rules (see operation 230). Such explicit user-specified subset rules may specify that a certain table should be subsetted using a specific WHERE clause.

When specifying a rule to pick a partial set of rows, a user can specify that "both" ancestor and descendant rows should be included, or that ancestor rows only should be included, or "neither" ancestor nor descendant rows should be included (see operation 240). For example, in a star schema when subsetting is based on fact tables, a rule might only include only ancestor table(s). Whereas, when subsetting based on dimensions, a rule might include both ancestors and descendants. In some cases it may be desirable to not have the tool decide how to pick related rows and in these cases a "neither" option can be used. When using neither ancestors nor descendants, a user might provide any number of WHERE clauses that would serve to pick up related rows from ancestor tables and/or descendant tables.

After specifying the rules, the rules are applied to the source database to estimate the subset size (see operation 250), and the user can view the space estimate in terms of number of rows, percentage of rows, data size, and percent of data size. If the resulting subset space estimates meet the user's space goals, they can proceed with the subset or they can return to an earlier operation.

The user can pick the execution model that would be used to accomplish the subset (see operation 260). In some embodiments, a subsetting execution plan is generated (see operation 270), which plan codifies specific steps to be executed during actual creation of the target subset database 134. In the embodiment of system 200 the actual performance of the export of the data to create the target subset database 134 is performed (see operation 280) and various statistics of the resulting the target subset database 134 are provided to the user (see operation 290).

Figure 3:
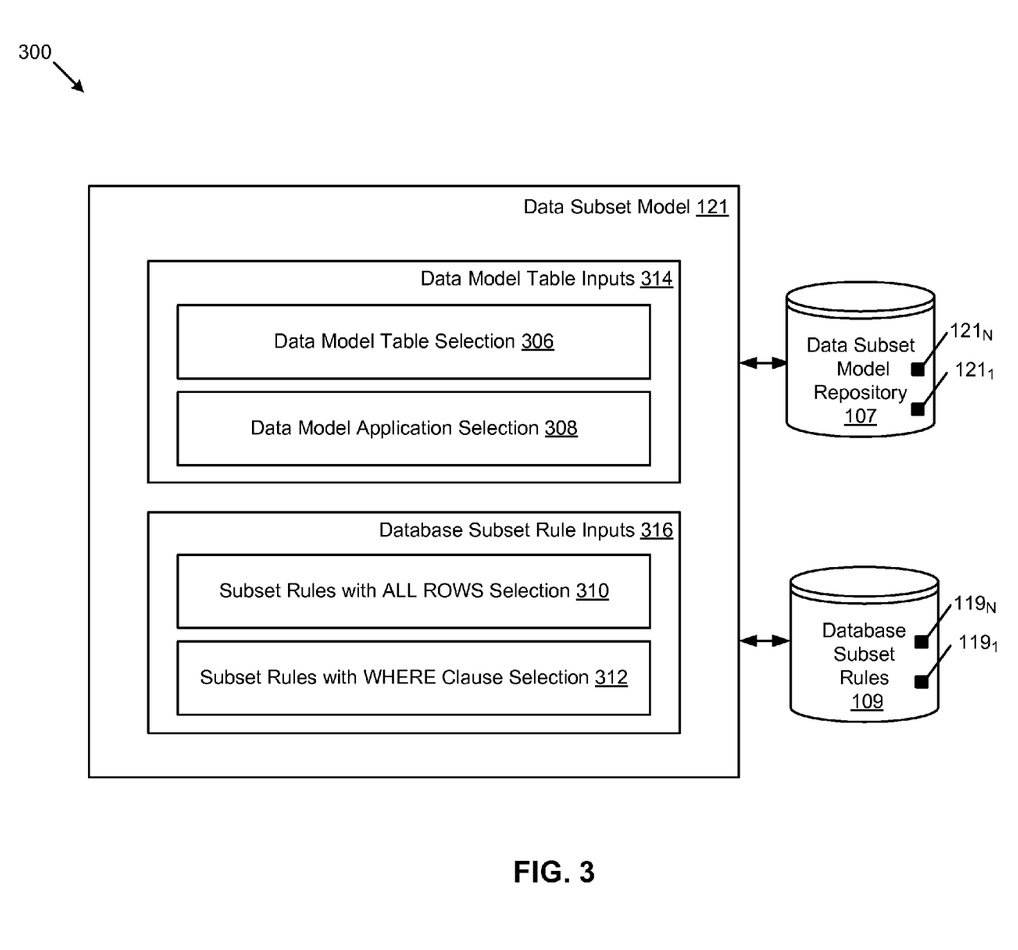
FIG. 3 is a hierarchy diagram showing a data subset model used for performing referentially-complete data subsetting using relational databases, according to some embodiments.

FIG. 3 is a hierarchy diagram 300 showing a data subset model used for performing referentially-complete data subsetting using relational databases. As an option, the present hierarchy may be implemented in the context of the architecture and functionality of the embodiments described herein. Also, the hierarchy diagram 300 or any aspect therein may be implemented in any desired environment.

Data Subset Model

The data subset model defines the list of applications, and/or templates pertaining to the target subset, the rules that describe which tables to subset, and the rules that describe what rows to keep. Strictly as an example, a data subset model (e.g., data subset model $121_1$, data subset model $121_N$) defines:

Tables that are intended to be included (in whole or in part) in the target subset.
Relationships between tables and applications.
Subset rules used to identify characteristics of rows in a table that are intended to be included in the target subset:
Subset rules can specify "All rows" to indicate inclusion of all rows of the table.
Subset rules can specify to include only some certain rows, where the some certain rows allow the use of a WHERE clause that describes which rows are to be included in the target subset.

Such specifications can be codified to be processed by a computer. For example, data model table inputs 314 can include one or more data structures to codify a data model table selection 306, and/or a data model application selection 308. Similarly, database subset rule inputs 316 can include one or more data structures to codify a subset rule indicating an ALL ROW selection 310, and/or a subset rule with a WHERE clause selection 312.

A given instance of a source database can be analyzed to determine the expected size (see FIG. 5) of a resulting target subset database. Such an analysis can proceed on the basis of a data subset model 121. In some embodiments, the analysis is performed in accordance with the flow of FIG. 4.

Figure 4:
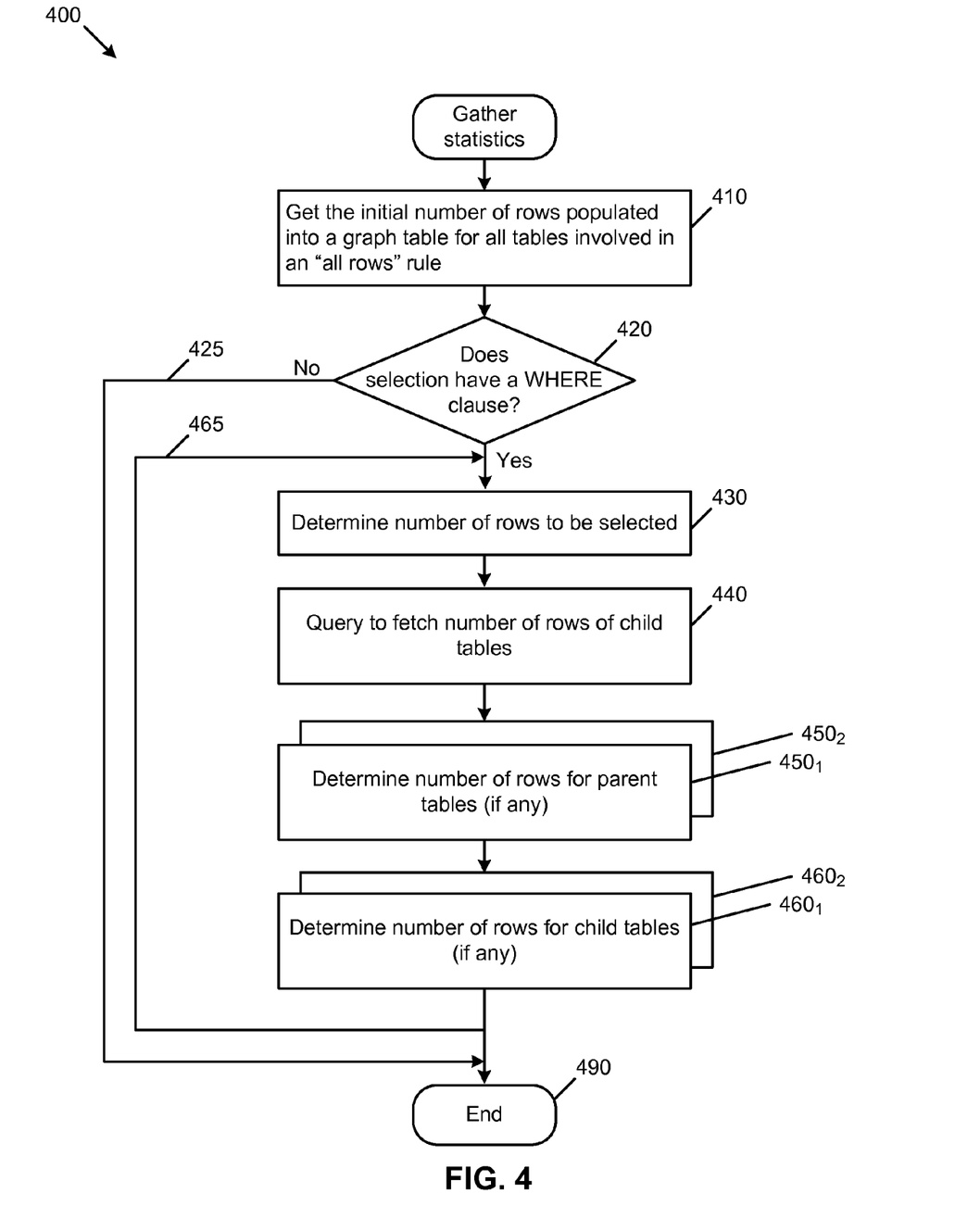
FIG. 4 is a flow chart showing operations and decisions used in performing space analysis to perform referentially-complete data subsetting using relational databases, according to some embodiments.

FIG. 4 is a flow chart 400 showing operations and decisions used in performing space analysis to perform referentially-complete data subsetting using relational databases. As an option, the present flow chart 400 may be implemented in the context of the architecture and functionality of the embodiments described herein. Also, the flow chart 400 or any aspect therein may be implemented in any desired environment.

Space Analysis

After a user specifies a data subset model 121, the database subsetting application 105 gathers statistics for all tables and the selected rows according to the data subset model. The statistics are populated into a subset graph table. Subset space estimation proceeds as follows:

Store the initial number of rows populated into a space analysis data structure (e.g., a directed graph representation and/or a graph table) for all tables involved in an "all rows" rule (see operation 410).
If a table does not have a WHERE clause rule (see decision 420), then the data model is now complete on the basis of the "all rows" rule (see operation 410), and the flow (see path 425) proceeds to the end (see endpoint 490).
If a table does have a corresponding WHERE clause rule (see decision 420), then run a database analysis command (e.g., an "explain plan command") on the WHERE clause to determine what rows will be included (e.g., how many rows considered, a number of rows to be selected, what percentage of rows will be selected, etc.), then update the number of rows to be included in the space analysis data structure.
Next, if the number of rows was updated, then recursively process the effects of the WHERE clause rule on child tables. The recursion rolls back if the number of rows was not updated.

Recursion Processing

Recursion proceeds as follows: Identify parent and any children, and process within the flow of flow chart 400. Processing of tables proceeds recursively until the processing converges such that no more rows are added (this is called referential closure). It is possible that the recursion might step into a relationship cycle in the graph. Any cycles found in the relationships can be handled using a shadow table.

In exemplary operation, recursion processing includes the following operations:

Process Parents (see recursive operation $450_1$ and recursive operation $450_2$):
Pull in any rows needed from the parent table for rows in the current table.
Process current table on parent table.
Process Children (see recursive operation $460_1$ and recursive operation $460_2$):
If current table has children, pull in any rows needed from the child table for rows in the current table.
Process the current table on the child table.
Process Current Table while observing any "both" or "neither" (or other) rules for ancestor processing:
Add rows for current table in accordance with the WHERE clause specified. If any rows were added, then, if there is a parent table and ancestors are to be included then process parents on current table.
If there is a child table and ancestors and descendants are to be included then process children on current table.

Iterative WHERE Clause Processing

When a selection has one or more WHERE clauses (see decision 420) processing iterates as follows:

Generate a query to fetch the child table rows as a result of subsetting the parent tables rows with the WHERE clause, and call a database command (e.g., an explain plan command) on the child table query to determine the number of rows fetched for the table (see operation 430). Add the result to the current number of rows for the child (see operation 440) in the space analysis data structure, and keep a record of tables processed (so far).
If the table has parents that were not processed earlier, recursively process the parent effects see recursive operation $450_1$ and recursive operation $450_2$).
If the table has children that were not processed earlier, recursively process the child effects (see recursive operation $460_1$ and recursive operation $460_2$).
If there are more clauses to process, then return via path 465. After all rules are processed, then stop (see endpoint 490). At this point the space analysis data structure contains a prediction of the number of rows that would be present in the target subset database after the subsetting processing completes. A subset percentage statistic can be calculated by comparing the predicted number of rows to the number of rows reported from operation 410. Further, the subset size can be predicted using the predicted number of rows and the average row length per row.

Compute Subset

Subset computation proceeds in a fashion similar to the aforementioned space analysis. However, instead of running a database analysis command, an actual database query is run in order to populate the rows selected by the subset clause into a persistent intermediate result staging area (e.g., a temporary table, a shadow table, etc.) of row IDs. Processing proceeds as follows:

Create a persistent intermediate result staging area (e.g., a temporary table, a shadow table, etc.) in which to store a subsetting execution plan 115 (initially including an accounting of row IDs for each of the tables for which rows are to be present in the subset).

For each table with at least one respective database subset rule input 316, run a query to export the row IDs that match the WHERE clause of the percentage rule. A percentage rule can be met by picking x percent of rows in random. For instance a certain percentage of rows can be satisfied by picking the first n rows, or may be picked by a statistical sampling of the rows, or n rows may be picked randomly, or n rows may be picked based on the first n blocks of data in the table, etc.

Update the number of rows populated in the space analysis data structure.

If rows were populated by the last query, then for each parent or child table do the following routines to create a subsetting execution plan 115 (including a row-by-row accounting of row IDs for each of the tables for which rows are to be present in the subset).

a. Generate a query to fetch the parent/child table rows as a result of subsetting the table with a database subset rule 109 (e.g., database subset rule 119$_1$, database subset rule 119$_N$).

b. Insert the row IDs of the matched rows from executing the query in routine (a) into the persistent intermediate result staging area (e.g., a temporary table, a shadow table, etc.).

c. Keep a record of tables processed so far. Add this table to the record as having been processed.

d. If any rows were inserted and the table has parents that were not processed earlier, process the parent effects by calling routine (a).

e. If any rows were inserted and the table has children that were not processed earlier, process the child effects.

f. After all rules are processed stop returning to routine (a).

At this point the persistent intermediate result staging area (e.g., a temporary table, a shadow table, etc.) contains the row IDs for each row that is intended to appear in the target subset database. Processing scans through the row IDs to make a list of tables so that any and all tables that have any rows in the persistent intermediate result staging area (e.g., a temporary table, a shadow table, etc.) are included in the subset. These tables will be processed differently during subset generation.

Figure 5:
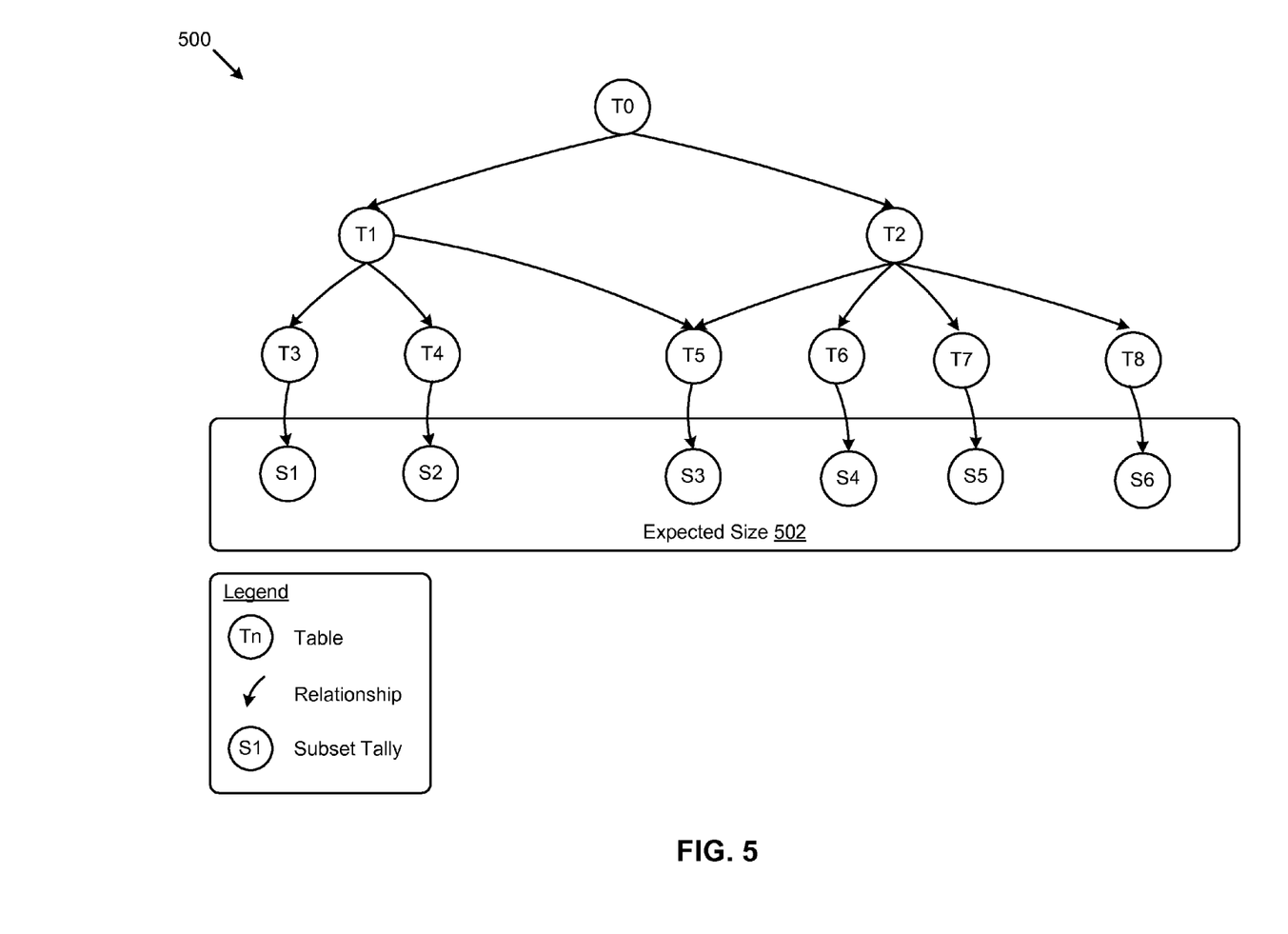
FIG. 5 is a graphic representation of a directed graph 500 used in performing referentially-complete data subsetting using relational databases, according to some embodiments.

FIG. 5 is a graphic representation of a directed graph 500 used in performing referentially-complete data subsetting using relational databases. As an option, the present directed graph 500 may be implemented in the context of the architecture and functionality of the embodiments described herein. Also, the directed graph 500 or any aspect therein may be implemented in any desired environment. And, the directed graph 500 can be represented as a relational database table.

The directed graph 500 includes a root node T0, which can be specified by any aspect of a data subset model 121. Following the flow of FIG. 4, a directed graph can be compiled. The dependent tables (e.g., table node T1 through table node Tn) can be added to the directed graph, and the relationships between a particular table node and another table node is represented as an edge, as shown.

In traversing the directed graph, upon reaching a leaf table node (e.g., T3, T4, T5, T6, T7, T8), then a subset tally node is created to contain the tally (e.g., row count, or list of row IDs).

As shown, in some cases, a particular table (e.g., table node T5) is a child of multiple parents, and traversal through that node a second (or nth) time does not double count the projection of the row count or double enter the row IDs.

In exemplary embodiments, the act of traversing the directed graph from a first table node to a second table node includes calculating the impact of projecting a first node onto a second node, based on the edge. Keeping a tally of traversals and projections aids in determining whether the impact of projecting a first node onto a second node had been previously calculated (and thus does not double count the projection).

When all of the subset tally nodes have been created (with its respective tally) then the total of the tallies in the tally nodes can be used to calculate the expected size 502 using the tallied number of rows times the average row length per row.

In exemplary embodiments, a computer serves for receiving aspects of a data subset model, and then creating the directed graph, where any two table nodes in the directed graph represent respective relational database tables, and an edge between the any two table nodes represent a relationship between the two table nodes.

Figure 6:
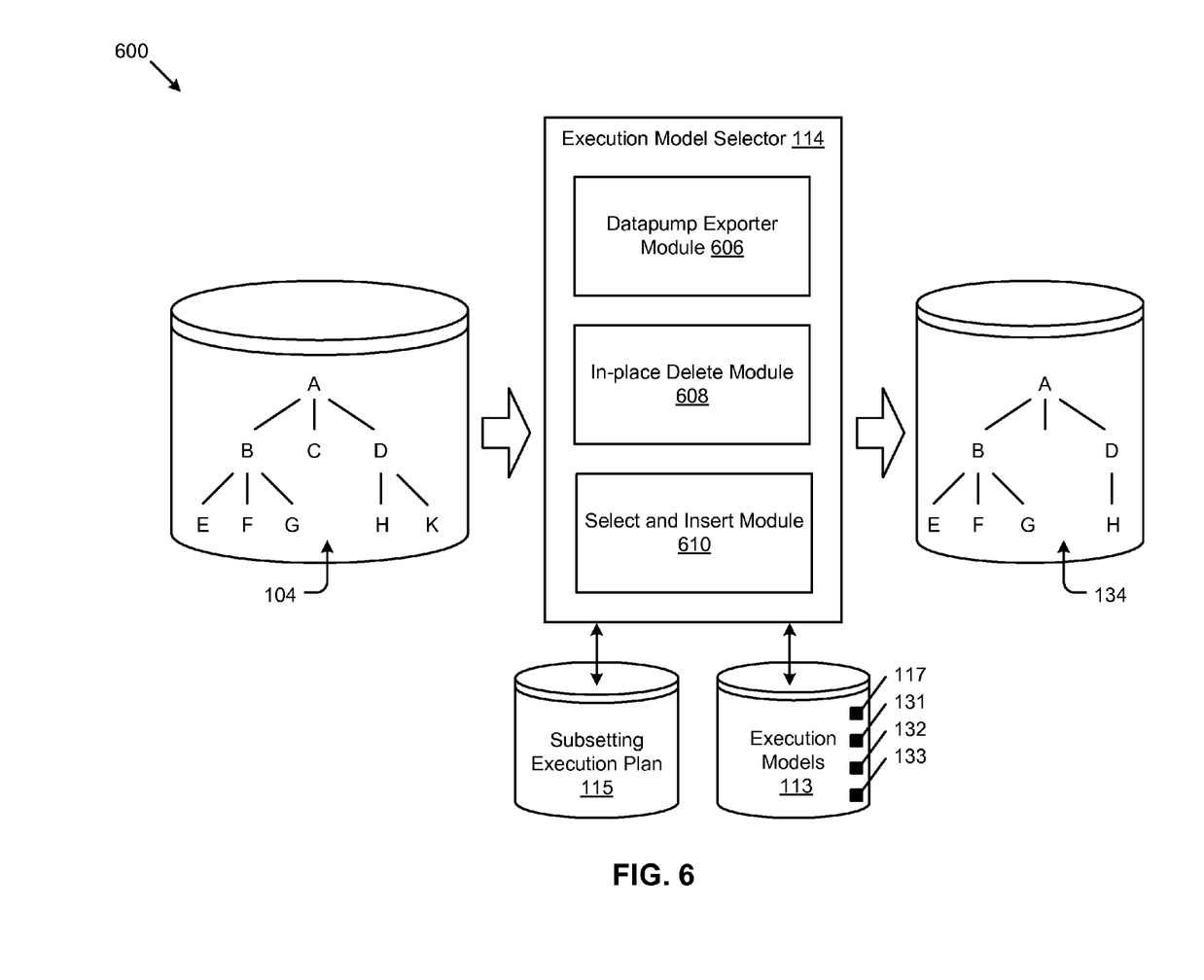
FIG. 6 is a schematic diagram of a selector subsystem for performing referentially-complete data subsetting using relational databases, according to some embodiments.

FIG. 6 is a schematic diagram of a selector subsystem 600 for performing referentially-complete data subsetting using relational databases. As an option, the present selector subsystem 600 may be implemented in the context of the architecture and functionality of the embodiments described herein. Also, the selector subsystem 600 or any aspect therein may be implemented in any desired environment.

Subset Execution

As shown, the selector subsystem 600 comprises an execution model selector 114, which in turn shows three subset execution methods implemented by three respective subset execution modules, namely:

A datapump exporter module 606;

An in-place delete module 608; and

A select and insert module 610 for select and delete operations conducted over an SQL connection.

A user can interface with the execution model selector 114 to specify a selected subset execution model 117 from a set of execution models 113.

Certain operations in the application of the selected subset execution model 117 on a subsetting execution plan 115 use the persistent intermediate result staging area (e.g., a temporary table, a shadow table, etc.) of row IDs to determine which rows to populate into the target subset database. Such uses are further described below.

Datapump Exporter

In the case of the datapump exporter execution model 131, a query is constructed so as to fetch from the source database 104 only those rows in the persistent intermediate result staging area (e.g., a temporary table, a shadow table, etc.) comprising the row IDs of the rows to be populated into the target subset database.

In-place Delete

In the in-place delete execution model 132, the persistent intermediate result staging area (e.g., a temporary table, a shadow table, etc.) of row IDs is used to move the rows to be subsetted as follows:

Create a new table to move the rows that need to be preserved. One technique renames the original table and selectively copies over the rows that need to be preserved into a new table. Then drop the renamed table and rebuild any other dependent objects on the table such as indexes, views, materialized views etc. This technique can be performed without incurring overhead associated with logging Using an in-place delete by copying an entire table from a source database to a target subset database, then using delete commands to delete the rows that are not intended to be present in the subsetted database.

Delete the rows that are not needed.

Select and Insert

A select and insert execution model 133 performs select and delete operations conducted over an SQL connection.

Of course other execution models can be stored in a persistent store for execution models 113, and can be retrieved for execution by an execution model selector 114.

Additional Embodiments of the Disclosure

Figure 7:
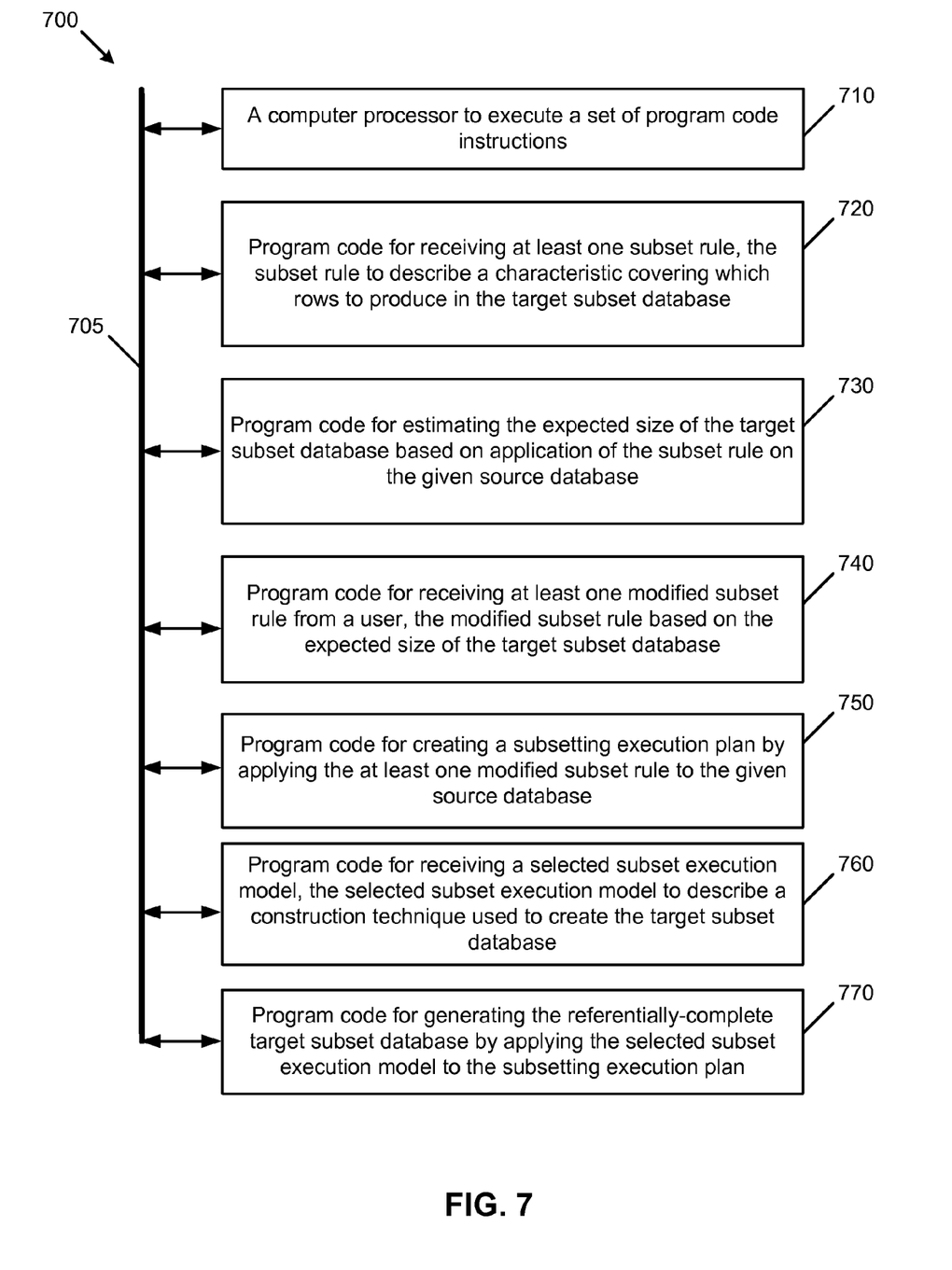
FIG. 7 depicts a system for performing referentially-complete data subsetting using relational databases, according to some embodiments.

FIG. 7 depicts a system for performing referentially-complete data subsetting using relational databases. As an option, the present system 700 may be implemented in the context of the architecture and functionality of the embodiments described herein. Of course, however, the system 700 or any operation therein may be carried out in any desired environment. As shown, system 700 comprises at least one processor and at least one memory, the memory serving to store program instructions corresponding to the operations of the system. As shown, an operation can be implemented in whole or in part using program instructions accessible by a module. The modules are connected to a communication path 705, and any operation can communicate with other operations over communication path 705. The modules of the system can, individually or in combination, perform method operations within system 700. Any operations performed within system 700 may be performed in any order unless as may be specified in the claims. The embodiment of FIG. 7 implements a portion of a computer system, shown as system 700, comprising a computer processor to execute a set of program code instructions (see module 710) and modules for accessing memory to hold program code instructions to perform: receiving, by a computer, at least one subset rule, the subset rule to describe a characteristic covering which rows to produce in the target subset database (see module 720); estimating the expected size of the target subset database based on application of the subset rule on the given source database (see module 730); receiving at least one modified subset rule, the modified subset rule based on the expected size of the target subset database (see module 740); creating a subsetting execution plan by applying the at least one modified subset rule to the given source database (see module 750); receiving a selected subset execution model, the selected subset execution model to describe a construction technique used to create the target subset database (see module 760); and generating the referentially-complete target subset database by applying the selected subset execution model to the subsetting execution plan (see module 770).

System Architecture Overview

Figure 8:
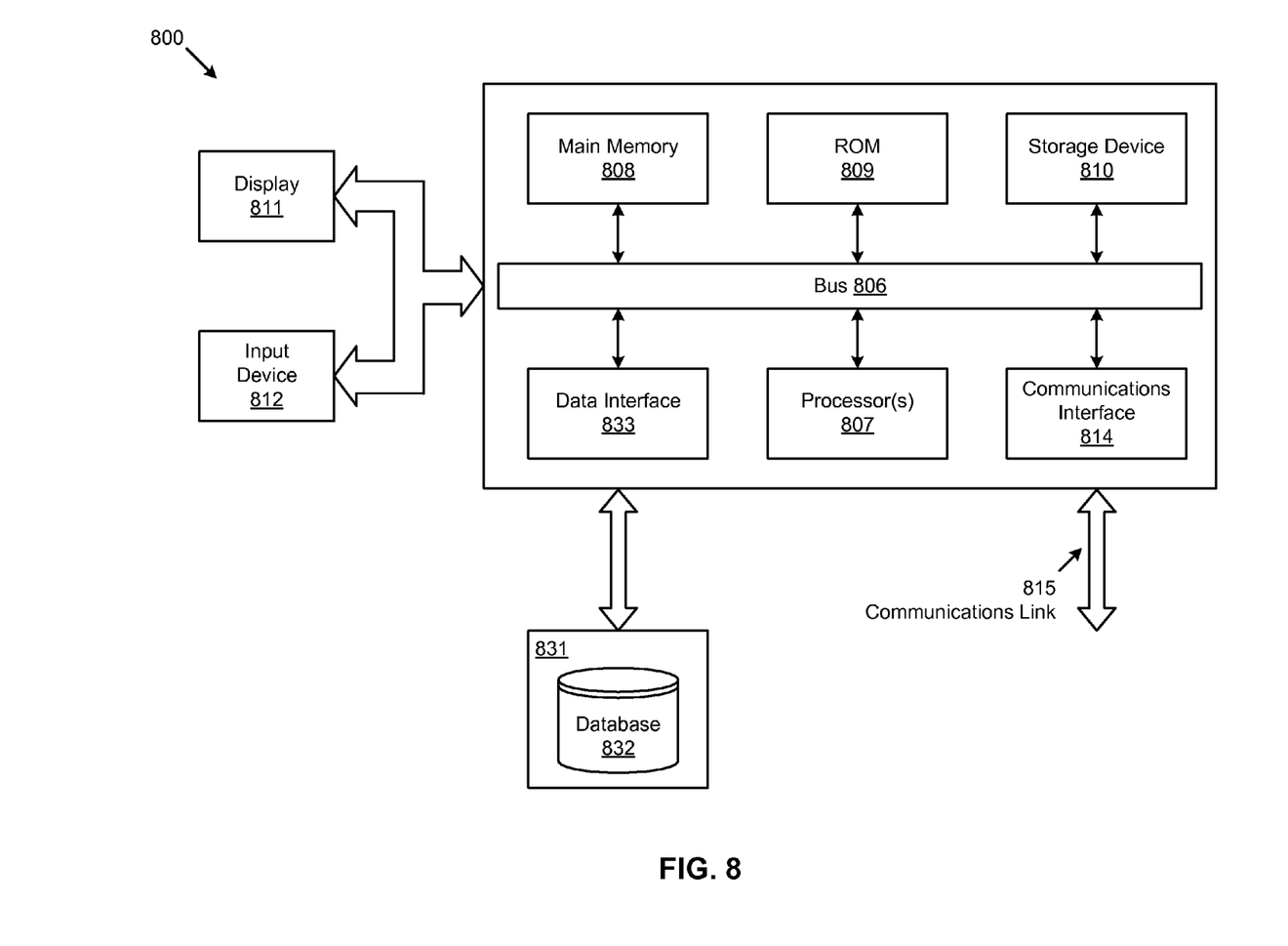
FIG. 8 depicts a block diagram of an instance of a computer system suitable for implementing an embodiment of the present disclosure.

FIG. 8 depicts a block diagram of an instance of a computer system 800 suitable for implementing an embodiment of the present disclosure. Computer system 800 includes a bus 806 or other communication mechanism for communicating information, which interconnects subsystems and devices, such as a processor 807, a system memory 808 (e.g., RAM), a static storage device (e.g., ROM 809), a disk drive 810 (e.g., magnetic or optical), a data interface 833, a communication interface 814 (e.g., modem or Ethernet card), a display 811 (e.g., CRT or LCD), input devices 812 (e.g., keyboard, cursor control), and an external data repository 831.

According to one embodiment of the disclosure, computer system 800 performs specific operations by processor 807 executing one or more sequences of one or more instructions contained in system memory 808. Such instructions may be read into system memory 808 from another computer readable/usable medium, such as a static storage device or a disk drive 810. In alternative embodiments, hard-wired circuitry may be used in place of or in combination with software instructions to implement the disclosure. Thus, embodiments of the disclosure are not limited to any specific combination of hardware circuitry and/or software. In one embodiment, the term "logic" shall mean any combination of software or hardware that is used to implement all or part of the disclosure.

The term "computer readable medium" or "computer usable medium" as used herein refers to any medium that participates in providing instructions to processor 807 for execution. Such a medium may take many forms, including but not limited to, non-volatile media and volatile media. Non-volatile media includes, for example, optical or magnetic disks, such as disk drive 810. Volatile media includes dynamic memory, such as system memory 808.

Common forms of computer readable media includes, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory medium from which a computer can read data.

In an embodiment of the disclosure, execution of the sequences of instructions to practice the disclosure is performed by a single instance of the computer system 800. According to other embodiments of the disclosure, two or more computer systems 800 coupled by a communication link 815 (e.g., LAN, PTSN, or wireless network) may perform the sequence of instructions required to practice the disclosure in coordination with one another.

Computer system 800 may transmit and receive messages, data, and instructions, including programs (e.g., application code), through communication link 815 and communication interface 814. Received program code may be executed by processor 807 as it is received, and/or stored in disk drive 810 or other non-volatile storage for later execution. Computer system 800 may communicate through a data interface 833 to a database 832 on an external data repository 831. A module as used herein can be implemented using any mix of any portions of the system memory 808, and any extent of hard-wired circuitry including hard-wired circuitry embodied as a processor 807.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are, accordingly, to be regarded in an illustrative sense rather than restrictive sense.

What is claimed is:

1. A computer implemented method for constructing a referentially-complete target subset database from a source database, the method comprising:
   estimating an expected size of the target subset database based at least in part on application of a set of database subset rules on the source database, wherein the set of database subset rules comprises one or more database subset rules specifying one or more portions of the source database to be included in the target subset database;

determining if the expected size of the target subset database meets a target subset database size goal, wherein if the goal is not met:

modifying the set of database subset rules based at least in part on the expected size of the target subset database, such that application of the modified set of database subset rules on the source database results in the target subset database having a second expected size that is different from the expected size;

creating a subsetting execution plan by applying the modified set of database subset rules to the source database; and generating, by a computer, the referentially-complete target subset database by applying the selected subset execution model to the subsetting execution plan.

2. The method of claim 1, wherein estimating the expected size comprises creating in a computer memory, a directed graph comprising table nodes, wherein two table nodes in the directed graph represent respective relational database tables, and an edge in the directed graph represents a relationship between the two table nodes.

3. The method of claim 1, wherein a database subset rule of the one or more database subset rules comprises at least one of, a name of a table to include, a Boolean operation to apply to a row of a table, and a name of a table to exclude.

4. The method of claim 1, further comprising receiving a selected subset execution model, the selected subset execution model to describe a construction technique used to create the target subset database.

5. The method of claim 2, further comprising traversing the directed graph from a first table node to a second table node, wherein the act of traversing comprises calculating an impact of projecting a first node onto a second node, based at least in part on the edge.

6. The method of claim 1, wherein the selected subset execution model is an export model.

7. The method of claim 1, wherein the selected subset execution model is an in-place delete execution model.

8. A computer system for constructing a referentially-complete target subset database from a source database, comprising:

a computer processor to execute a set of program code instructions; and a memory to hold the program code instructions, in which the program code instructions comprises program code to perform, estimating an expected size of the target subset database based at least in part on application of a set of database subset rules on the source database, wherein the set of database subset rules comprises one or more database subset rules specifying one or more portions of the source database to be included in the target subset database;

determining if the expected size of the target subset database meets a target subset database size goal, wherein if the goal is not met:

modifying the set of database subset rules based at least in part on the expected size of the target subset database, such that application of the modified set of database subset rules on the source database results in the target subset database having a second expected size that is different from the expected size;

creating a subsetting execution plan by applying the modified set of database subset rules to the source database; and generating, by a computer, the referentially-complete target subset database by applying the selected subset execution model to the subsetting execution plan.

9. The computer system of claim 8, wherein estimating the expected size comprises creating in a computer memory, a directed graph comprising table nodes, wherein two table nodes in the directed graph represent respective relational database tables, and an edge in the directed graph represents a relationship between the two table nodes.

10. The computer system of claim 8, wherein a database subset rule of the one or more database subset rules comprises at least one of, a name of a table to include, a Boolean operation to apply to a row of a table, and a name of a table to exclude.

11. The computer system of claim 8, wherein the program code instructions further comprising program code for receiving a selected subset execution model, the selected subset execution model to describe a construction technique used to create the target subset database.

12. The computer system of claim 9, wherein the program code instructions further comprising program code for traversing the directed graph from a first table node to a second table node, wherein the act of traversing comprises calculating an impact of projecting a first node onto a second node, based at least in part on the edge.

13. The computer system of claim 8, wherein the selected subset execution model is an export model.

14. The computer system of claim 8, wherein the selected subset execution model is an in-place delete execution model.

15. A computer program product embodied in a non-transitory computer readable medium, the computer readable medium having stored thereon a sequence of instructions which, when executed by a processor causes the processor to execute a process to construct a referentially-complete target subset database from a source database, the process comprising:

estimating an expected size of the target subset database based at least in part on application of a set of database subset rules on the source database, wherein the set of database subset rules comprises one or more database subset rules specifying one or more portions of the source database to be included in the target subset database;

determining if the expected size of the target subset database meets a target subset database size goal, wherein if the goal is not met:

modifying the set of database subset rules based at least in part on the expected size of the target subset database, such that application of the modified set of database subset rules on the source database results in the target subset database having a second expected size that is different from the expected size;

creating a subsetting execution plan by applying the modified set of database subset rules to the source database; and generating, by a computer, the referentially-complete target subset database by applying the selected subset execution model to the subsetting execution plan.

16. The computer program product of claim 15, wherein estimating the expected size comprises creating in a computer memory, a directed graph comprising table nodes, wherein two table nodes in the directed graph represent respective relational database tables, and an edge in the directed graph represents a relationship between the two table nodes.

17. The computer program product of claim 15, wherein a database subset rule of the one or more database subset rules comprises at least one of, a name of a table to include, a Boolean operation to apply to a row of a table, and a name of a table to exclude.

18. The computer program product of claim 15, wherein the computer readable medium further comprising instructions for receiving a selected subset execution model, the selected subset execution model to describe a construction technique used to create the target subset database.

19. The computer program product of claim 16, wherein the computer readable medium further comprising instructions for traversing the directed graph from a first table node to a second table node, wherein the act of traversing comprises calculating an impact of projecting a first node onto a second node, based at least in part on the edge.

20. The computer program product of claim 15, wherein the selected subset execution model is an export model.

* * * * *

UNITED STATES PATENT AND TRADEMARK OFFICE
CERTIFICATE OF CORRECTION

PATENT NO. : 8,935,234 B2
APPLICATION NO. : 13/603126
DATED : January 13, 2015
INVENTOR(S) : Pattabhi et al.

It is certified that error appears in the above-identified patent and that said Letters Patent is hereby corrected as shown below:

In the Specification

In column 4, line 16, delete "subset" and insert -- subset. --, therefor.

In column 6, line 23, delete "the a" and insert -- the --, therefor.

In column 10, line 67, delete "logging" and insert -- logging. --, therefor.

Signed and Sealed this
Eighth Day of September, 2015

Michelle K. Lee
*Director of the United States Patent and Trademark Office*